United States Patent [19]

Kotok et al.

[11] 4,099,231
[45] Jul. 4, 1978

[54] MEMORY CONTROL SYSTEM FOR TRANSFERRING SELECTED WORDS IN A MULTIPLE MEMORY WORD EXCHANGE DURING ONE MEMORY CYCLE

[75] Inventors: Alan Kotok, Waltham; Patrick Sullivan, Stow; Paul M. Guglielmi, Westboro; David A. Gross, Sudbury, all of Mass.

[73] Assignee: Digital Equipment Corporation, Maynard, Mass.

[21] Appl. No.: 618,604

[22] Filed: Oct. 1, 1975

[51] Int. Cl.² .......................................... G06F 13/00
[52] U.S. Cl. .................................................. 364/200
[58] Field of Search .............................. 340/172.5; 364/200 MS File, 900 MS File

[56] References Cited

U.S. PATENT DOCUMENTS

| | | | |
|---|---|---|---|
| 3,389,380 | 6/1968 | Ashbaugh et al. | 340/172.5 |
| 3,395,392 | 7/1968 | Kulikauskas et al. | 340/172.5 |
| 3,436,734 | 4/1969 | Pomerene et al. | 340/172.5 |
| 3,445,820 | 5/1969 | Wissick | 340/172.5 |
| 3,601,812 | 8/1971 | Weisbecker | 340/172.5 |
| 3,609,700 | 9/1971 | Wollum | 340/172.5 |
| 3,806,881 | 4/1974 | Miwa et al. | 340/172.5 |
| 3,812,473 | 5/1974 | Tucker | 340/172.5 |
| 3,821,715 | 6/1974 | Hoff, Jr. et al. | 340/172.5 |
| 3,889,237 | 6/1975 | Alferness et al. | 340/172.5 |
| 3,916,385 | 10/1975 | Parmar et al. | 340/172.5 |
| 3,974,479 | 8/1976 | Kotok et al. | 340/172.5 |
| 4,008,462 | 2/1977 | Kanda | 340/172.5 |
| 4,027,291 | 5/1977 | Tokura et al. | 340/172.5 |

*Primary Examiner*—Melvin B. Chapnick
*Attorney, Agent, or Firm*—Thomas C. Siekman; John M. Gunther; Arthur W. Fisher

[57] ABSTRACT

A memory control apparatus for use in a digital computer system. The computer system comprises a central processing unit and a main memory which has a plurality of memory units. The processor has control circuitry for simultaneously addressing a plurality of words stored in the memory locations in the memory units. The processor addresses the plurality of words by the combination of a memory address signal and word request control signal which are equal to the number of words to be transferred. While addressing of the memory units occurs in parallel, the transfer of words occurs serially. The initial word as defined by the memory address signal is transferred first with the remaining words transferred in ascending modulo four order. If one or more of the four words has not been requested, it is automatically skipped by the control apparatus with no loss in time or continuity. Logic in both the processor and the memory unit is initialized to acount for the words being transferred such that each word selected is stored in the proper buffer.

21 Claims, 6 Drawing Figures

MEMORY CONTROL SYSTEM FOR TRANSFERRING SELECTED WORDS IN A MULTIPLE MEMORY WORD EXCHANGE DURING ONE MEMORY CYCLE

BACKGROUND OF THE INVENTION

1. Field of the Invention

This invention relates to digital data processing systems of the type having a plurality of memory controllers with interleaved memory units connected to a processing unit by means of a common bus. More particularly, this invention relates to a memory control unit for read and write operations in which the requested word is transferred first with the remaining words serially transferred in ascending modulo four order from/to the memory units.

2. Prior Art

One of the limiting factors in a computer system is the time which is needed to transfer to the processor unit the data stored or to be stored in the memory unit. In order to increase the efficiency of computer systems, it has been recognized that multiple memory word transfers during one memory cycle are advantageous. The problem with multiple memory word transfers centers around the requirement for a large number of parallel data lines with a corresponding increase in the number of pins, wires, drivers, receivers, etc.. It has been found that the physical cost for providing an apparatus of this type becomes prohibitive. In addition, after the multiple memory word transfer has occurred, there is still required an apparatus which selects the requested word from the multiple words received. In has been found desirable to incorporate a selection mechanism which enables the needed word to be first transferred between the processor and memory unit followed serially during the same memory cycle with the rest of the remaining multiple words to be transferred.

SUMMARY OF THE INVENTION

In a synchronous data processing system of the type which this invention is concerned, when a processor unit initiates a memory operation, it transmits the memory address over the address section of the bus and enables a number of control lines over the control section of the bus to indicate the number of words to be transferred from/to the memory unit. Both a read and write operation utilize the same circuitry in essentially the same manner. For a read operation, the processor unit initializes its control circuitry to respond to each word to be transferred from the memory unit starting with the needed word. After the address and control lines are enabled, the memory unit indicates it has the words, retrieves the words from the designated locations in an interleaved main memory and transmits them over the data sections of the bus along with a separate data signal indicating data transmission. Concurrently, with the receipt of the control signals from the memory unit, the processor unit responds by its control circuitry to each set of signals to account for the words to be transferred in ascending modulo four order starting with the requested word being the first received followed by the remaining words, each word being stored in the proper processor buffer.

DETAILED DESCRIPTION OF THE PREFERRED EMBODIMENT

General Overview

Figure 1:
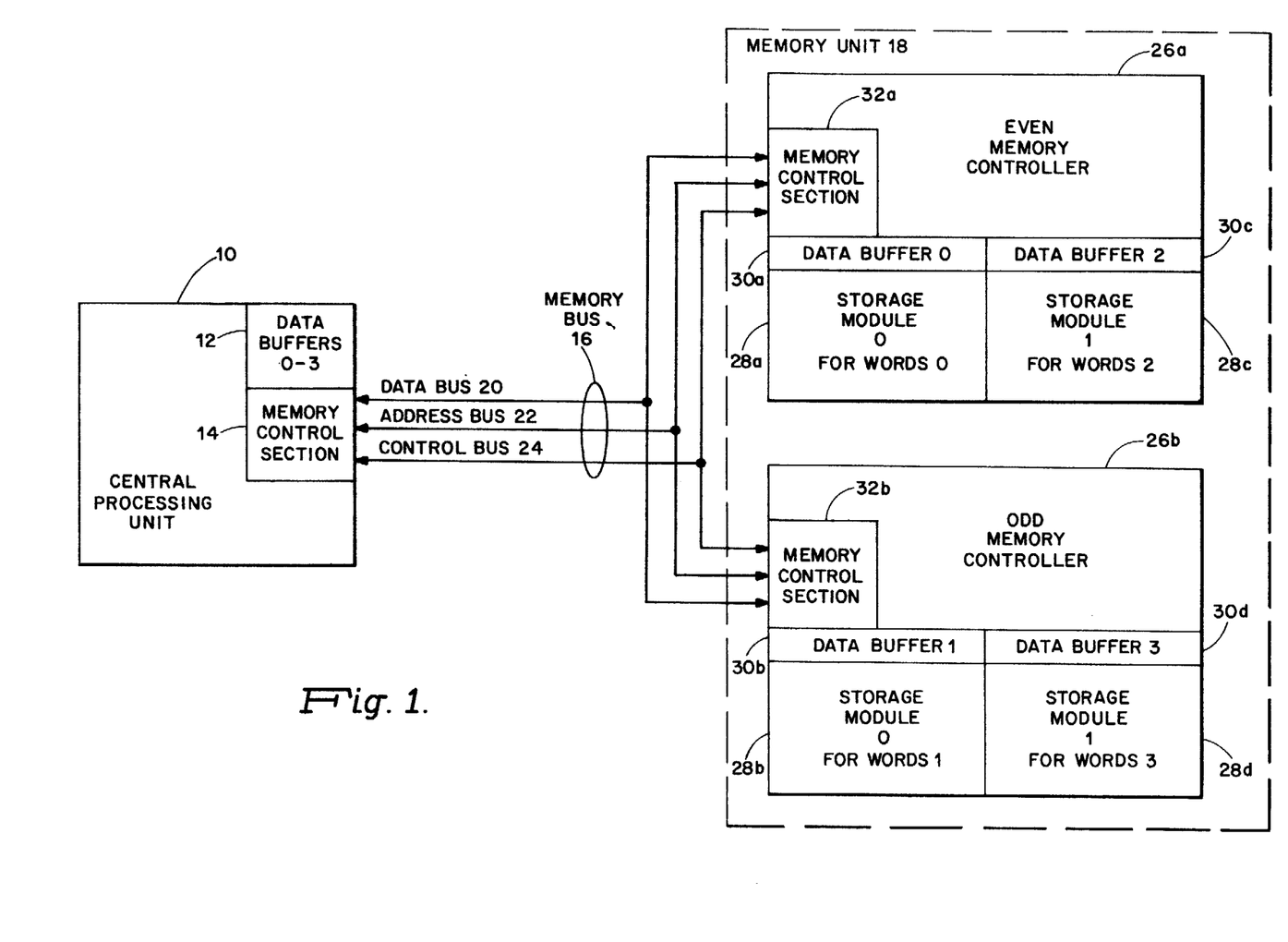
FIG. 1: is a simplified schematic diagram of a data processing system embodying the present invention.

As shown in FIG. 1, a data processing system incorporating the invention includes a central processing unit 10 including a plurality of data buffers 12. For purposes of this invention, it is assumed that a four word transfer will occur and hence four word buffers 0-3 of data buffer 12 are shown. Data buffer 12 receives data from storage locations in the main memory unit 18 or holds data to be transferred to the memory locations in main memory unit 18. A memory control section 14 in central processing unit 10 provides the processor's control signals to the memory unit 18 via memory bus 16. Memory bus 16 includes bus 20 for transferring the data between the central processing unit 10 and the main memory unit 18, bus 22 to locate particular locations in the memory unit 18 to which data may be sent or from which the data should be received, and bus 24 which transfers control signals indicating, among other things, the start of a memory cycle as well as which of the words from the memory unit 18 should be transferred.

The memory unit 18 comprises a plurality of memory controllers 26. There may be up to 16 memory controllers but only two, 26a and 26b, are shown. Each memory controller 26 responds to the signals over bus 16 and, in addition, provides corresponding signals to bus 16. Each memory controller contains at least two storage modules 28 which store the data of the memory unit. More particularly, each storge module has associated with it a data buffer 30 which stores data from/to the storage module 28. If there is a read cycle, data buffer 30 receives a word from the storage module 28 for the processor 14. Conversely, if there is a write cycle, data buffer 30 would store the data for writing into the storage module 28 during the write operation.

Since the present invention relates to the reading and writing of words in memory, there has been omitted in the drawings for sake of clarity the various circuit elements and connections relating solely to other operations which occur both in the central processing unit, memory unit and the memory control sections. Moreover, for the sake of conciseness and clarity, only the gates for the read operation are shown, it being understood that equivalent gates for the write operation exist.

A memory cycle is initiated when the central processing unit 10 issues a memory start signal, the cycle type (read or write) over control bus 24 and a memory address over address bus 22. Each memory controller 26 individually decodes the memory address and, when selected, issues a memory cycle request together with the memory address to the relevant storage modules 28. In the case of a write request, the data is loaded into the data buffers 12 prior to issuing the cycle request to the storage modules.

If the addressed memory controller 26 is not busy, such memory controller 26 responds with an acknowledge signal over control bus 24 and has the data from the addressed location in storage module 28 read into the corresponding data buffer 30. The acknowledge signal is gated to the central processing unit 10 indicating the acceptance of a memory request. The memory unit 18 then controls the transfer of data between the central processing unit 10 and memory unit 18.

Memory references from the processor 10 can access from one to four word locations in the memory unit 18. Normally, the references are directed to four word groups in memory designated quadwords (a quadword equalling words zero, one, two and three). More than one location can be addressed at once since four request lines in control bus 24 are included as part of the memory bus 16. Each request line acts in conjunction with the addresses over bus 22 to specify one word within the quadword. In operation, the central processing unit 10 supplies the starting address and the word request lines determine the number and the words accessed. Thus, the central processing unit can specify any or all of the words within a quadword.

Although one to four words may be addressed simultaneously by memory bus 16, data transfers and other communications from the memory unit 18 are on a serial basis. After the first word is accessed, words are then cycled in ascending modulo four order. For example, in a memory reference requesting a quadword with a starting address for word one (i.e. a code of 01), the words are serially transferred in the order of one, two, three, zero. Likewise, a memory reference with a starting address for word three (i.e. a code 11), the words are serially transferred in the order of three, zero, one, two.

As shown in FIG. 1, there are four storage modules 28, i.e. 28a to 28d. It is recognized that there are additional storage modules but for purposes of explaining the invention, only four storage modules are required. A quadword is distributed across the four storage modules with all words, such as a binary up/down counter 10136 by Motorola, Texas instrument, etc. zero being in storage module zero 28a, all words one being in storage module one 28b, etc. This is known as four-way interleaved memory in which the contents of the storage modules are arranged sequentially in quadword sets (one word per storage module) such that each word is accessed from one storage module. To facilitate correct module and word selection, as well as to receive the needed word first, the two low order address bits are used to identify the first storage module requested. The remaining address bits in combination with word request lines from control bus 24 identify the other selected words in the storage modules 28.

The interchange of module and word selection bits has the effect of addressing identical locations in each of the four selected storage modules 28. The storage module accessed first is determined by the lower two address bits of the starting address provided by processor 10 over bus 16 and the number of words accessed is determined by the number of word request lines enabled over bus 24. If a quadword request was required, all word request lines are enabled. However, it may be appropriate to skip one or more of the individual words. In this instance, not all the word request lines would be enabled. For example, if an address corresponding to word two were to be skipped, word request lines zero, one and three would be enabled and word request line two would be disabled.

Processor Control Circuitry 14

A memory cycle is started in response to request from the central processing unit 10. Since the central processing unit may request either a read or write operation of up to four words, the memory control unit of the present invention must keep track of which and how many words have been transferred. To this end, the memory control unit 14 employs counters to keep track of the various operations which occur in the transfer of words.

It should be noted that the instant invention may include a plurality of processing units 10 or their equivalents such as direct memory access devices, data channels, etc. Each of these devices may access one or more memory units 18 with the memory control section 14 of the instant invention.

Figure 2:
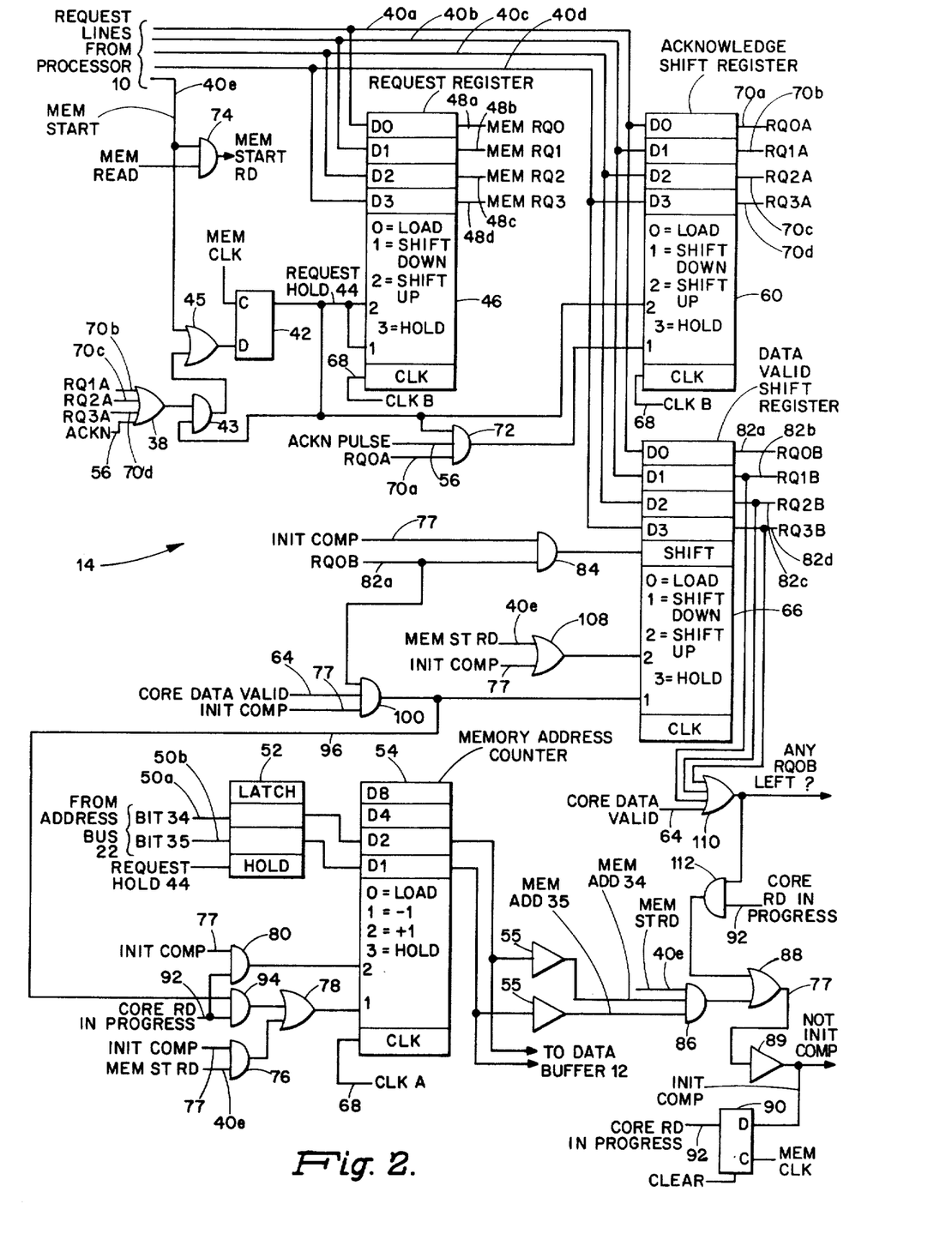
FIG. 2: is a schematic diagram of the memory control section incorporated in the processing unit of FIG. 1.

Referring now to FIG. 2, a memory cycle is started by asserting signals in the memory bus 16 in the following manner:

a. A memory start signal 40e is asserted by processor 10 into a D-type flip flop 42 setting the flip flop 42. The output of flip flop 42 is a high signal over line 44 which is provided into request shift register 46. For clarity purposes, the high signal over line 44 is called a request hold signal. Request register 46 is a well known shift register having a number 10141 and maufactured by Texas Instruments, Motorola, etc. When there was no request hold signal 44, the select input of shift register 46 was zero which provided a load function for shift register 46. A load function enables the register 46 to store the data received by its D0 to D3 inputs in its bit registers. When the request hold signal 44 is asserted, register 46 has both its one and two select signals high. This three value at the select inputs of register 46 means that a hold function occurs. When the next clock pulse is provided to register 46, the contents of the bit registers of register 46 are locked in. The signals held in register 46 are the control signals 40a to 40d which are the word request line signals. These signals are stored until the request hold signal 44 becomes false.

b. A memory read request signal over line 41 or a memory write request (not shown) signal is asserted and held depending upon whether a read or write cycle is initiated.

c. The word request signals over lines 40a to 40d are asserted and held to specify which words and how many are to be transferred. These signals are delivered to request register 46 at inputs D0 to D3 of register 46 and enable memory word request signals 48a to 48d (MEM RQO to MEM RQ3 which are transferred to memory controller 26 via bus 24. If a word request signal is true, then a word is transferred from memory unit 18. If a word request signal is false, then no word will be transferred from memory unit 18. Thus, the number of word request signals asserted true equals the number of words to be transferred from memory unit 18.

d. The memory addresses provided by processor 10 are sent over bus 22. In the preferred embodiment there are a plurality of address lines 22 with the address signals being asserted over address lines 14 to 35 (not shown) of bus 22. These address lines 22 address the memory unit 18. The two low order address signals, i.e. the signals over address lines 34 and 35 of bus 22, point to the word to be transferred from the memory unit 18 first. These lines are shown as 50a and 50b i FIG. 2. The address lines 14 to 33 point to the quadword in the storage modules 28. The address signals over lines 50a and 50b are stored in mixer latch circuit 52. Mixer latch 52 is a well known latch circuit made by Texas Instruments under the number 10173. Mixer latch 52 is responsive to the request hold signal 44 to store the low two order address signals until the request hold signal 44 becomes false. Thus, latch 52 provides a continuous output of the two low order address signals.

The request lines 40a to 40e and the address bus lines 50a to 50b are obtained in the following manner: When the central processing unit 10 requests a word and the word is not in cache or the cache is not to be used, a read cycle is initiated to read the words that are not valid in the cache or to read a single word. In this particular situation, the memory address signals 34 and 35 over lines 50a and 50b are enabled which identify the word that the central processor 10 first requests. If, however, a page refill for the cache or a cache channel read cycle were initiated, then the memory address signals 34 and 35 are derived from the request control lines 40a to 40d to generate an address that points to the first word in ascending modulo four order that is to be transferred.

The memory unit 18 receives the word request signals from lines 48a to 48d (the word request lines are identified as MEM RQ0, MEM RQ1, MEM RQ2 and MEM RQ3). In addition, the memory unit 18 also receives a memory start request signal 173. In response, the memory unit 18 provides acknowledge (ACKN) singals 56 provided that the memory unit 18 has the address. The generation of acknowledge signals is discussed in reference to FIG. 3 as well as the generation of data valid signals. Essentially, an acknowledge signal means memory unit 18 recognizes the address and a data valid signal means that the data in the memory unit is transferred to the memory buffers.

When the memory start signal 40e is asserted to initiate either a memory read or write cycle, an acknowledge shift register 60 which is identical to request register 46, is loaded with the same signals that were loaded nto the request register 46. The functionof shift register 60 is to compare the number of acknowledge signals 56 generated from the memory unit 18 to the number of word request lines asserted by processor 10 to determine when all the words requested by the processor 10 have been acknowledged by the memory unit 18.

In operation prior to request hold signal 44 occurring, the select input to acknowledge shift register 60 has a zero value. As a result, register 60 is loading with each clock pulse the signals at its D0 to D3 inputs. These signals are the word request line signals over 40a to 40d. With the occurrence of the request hold signal 44, the value to the select input of register 60 is changed. The select value is either two or three depending on the word request signals to the D0 through D3 inputs. More particularly, if the word request signal to input D0 is true, the register 60 has a three value at its select input and therefore locks in the word request signals. If the word request signal to the D0 input was false, shift register 60 would have a two value at its select input and would automatically shift out leading zeros. AND gate 72 provides for this automatic shifting capability since it is responsive to the RQ 0A signal provided from register 60. Thus, until RQ 0A is true, shift register 60 shifts up. When RQ 0A becomes true, then shift register 60 holds.

Acknowledge register 60 is held with the word request signals until an acknowledge signal 56 is generated from memory unit 18. When an acknowledge signal is generated, register 60 has the contents of its register shifted to indicate that a word request has been satisfied.

More particularly, AND gate 72 is responsive to the RQ 0A output of line 70a, the absence of an acknowledge pulse 56 from the memory unit 18 and the request hold signal 44. When an acknowledge pulse 56 is received, the output of AND gate 72 becomes false. With the output of AND gate 72 being false, the select input to register 60 is changed to a two value. With this input the register 60 shifts its contents such that the data stored in the register received from the D1 input is shifted up to the register associated with D0 input and the data stored in the D2 register location is shifted up to the D1 register location, etc. The contents of the D3 register location are made zero.

If the new contents of the highest register in register 60 were zero indicating no word request, then AND gate 72 wuld still provide a false output resulting in an automatic shifting operation occurring again. This happens since AND gate 72 has its lowest input responsive to the highest register in acknowledge register 60. As a result, the acknowledge register 60 positions the next word request in its highest register (RQ 0A output) so that true word requests are acknowledged with each acknowledge signal 56.

Ths operation is repeated until all true signals provided by lines 70 (RQ 0A to RQ 3A) are shifted out of acknowledge register 60. At the same time as the last word request is shifted out, the memory start 40e is cleared. This is shown by OR gate 38 which is responsive to the signals in the RQ 1A to RQ 3A lines 70 and the last acknowledge signal. When OR gate 38 receives the last acknowledge signal, i.e. false signals are in register positions two to four of acknowledge register 60, its output becomes false thereby disabling AND gate 43. AND gate 43 is coupled as one input to OR gate 45 which has as its other input the memory start signal. Since the memory start signal is only true at the beginning of the memory cycle, when AND gate 43 becomes false, OR gate 45 has only false input signals. As a result, flop 42 drops the request hold signal 44 on the next clock signal. Request register 46 is now ready to receive new word request signals.

Concurrently, with the loading of the word request signals in registers 46 and 60, data valid shift register 66 is also loaded. The function of data valid register 66 is twofold. First, it shifts the word request signals until its highest register contains the word request corresponding to the two low order signals of the address lines. By doing this, register 66 in conjunction with counter 54 allows the proper data buffer 12 to receive the first word from memory unit 18. Secondly, data valid register 66 compares the numer of data valid signals generated from the memory unit 18 to the number of word request signals provided by processor 10 to determine when all the word requests in the memory cycle have been transferred to the processor 10.

In satisfying its first function, data valid register 66 is responsive to memory address counter 54. Memory address counter 54 provides two functions also. First, it counts down the two low order bits to set up data valid register 66. Secondly, it counts up the two low order bits to identify the data buffer 12 to receive the next word from memory unit 18.

More specifically, when memory start signal 40e is asserted, and there is a read operation, AND gate 74 is enabled to provide a memory start read signal. This memory start read signal is provided into OR gate 108 and changes the load function of register 66 to a shift up function, i.e. the select input value changes from zero to two. In response, data valid register 66 which was loading the word request signals from word request lines 40a to 40d now begin to shift up these signals. In addition, memory address counter 54 is also loaded with the two low order address signals 34 and 35 which are also provided over bus 22. These signals specify the first word that will be received from memory unit 18. These signals are inputted via lines 50a to 50b into latch 52 and then transferred into memory address counter 54. Counter 54 is also responsive to the memory start read signal for changing its loading function to a decrementing function. This is accomplished by AND gate 76 and OR gate 78.

The data valid register 66 is the same as the acknowledge shift register 60; memory address counter 54 is a binary up/down counter which is well known in the art, such as a binary up/down counter 10136 by Motorola, Texas Instrument, etc.

Once the data valid register 66 and core address counter 54 receive the memory start read signal, they initialize themselves automatically. This occurs as follows:

a. With each clock pulse received in its clock input, memory address counter 54 decrements the contents of its registers unil a value of zero is reached. This occurs since once loaded, its select input has a value of one which provides the decrementing function. More specifically, AND gate 76 provides a true output to OR gate 78 resulting in a one value to the select input of counter 54. AND gate 76 is responsive to a - INIT COMP (not initialization complete) signal 77 and a memory start read signal. Only when counter 54 reaches a zero value is the INIT COMP signal given. As a result, - INIT COMP 77 is true for the clock times necessary to have this situation occur. The memory start read signal is true until the acknowledge signal for the last word is sent by memory control 28. MEM ST RD is always true until at least after INIT COMP signal becomes true. The first acknowledge signal from the memory will not arrive until after the initialization phase is completed. Conversely, the two select input to counter 54 is not true until the INIT COMP signal is given to AND gate 80. This does not occur until counter 54 has a zero value. Thus, depending on the two low order address signals, counter 54 counts from zero to three times.

b. The contents of the data valid register 66 are rotated such that the value in its lowest bit register is shifted to the next higher register and the value in the highest register is shifted to the lowest register each time the memory address counter 54 is decremented. More specifically, the output signals of data valid register 66 are provided over lines 82 as signals RQ 0B to RQ 3B. The RQ 0B signal 82a is provided to AND gate 84. AND gate 84 is also responsive to a - INIT COMP signal 77. Since the - INIT COMP signal 77 is true during the initialization phase, and since the other input to AND gate 84 is the signal for the highest bit register in shift register 66, as the shift register shifts, the output of AND gate 84 will provide the signal RQ 0B that was previously shifted from line 82. Thus, the word request signals in register 66 are merely rotated.

In addition, the memory address counter 54 is working simultaneously with register 66 since each is controlled by the same control signal. Thus, with each clock pulse going into its clock input, the data valid register 66 is rotated until memory counter 54 has a zero value.

To understand this situation, assume that word three was the first word requested. For word three, the D2 and D1 inputs of memory address counter 54 would have true signals. As soon as the select input to counter 54 becomes one, the true value received by the D2 and D1 inputs would be decremented with each clock pulse 68 until it reached zero. At this time, the output of AND gate 86 would become true. AND gate 86 is responsive to the zero value for the two low order address signals 55 inverted by inverters 55 and the memory start read signal. Upon AND gate 86 becoming true, it enables OR gate 88 which provides both the INIT COMP signal and the - INIT COMP signals 77. INIT COMP signal 77 disables AND gate 76 thereby removing the decrementing function of cunter 54 and in addition, disables AND gate 84 thereby halting the rotation of register 66. In addition, the INIT COMP signal 77 is provided into a D-type flip flop 90 via inverter 88 which on the next clock signal provides a CORE READ IN PROGRESS signal 92.

When the memory address counter 54 reaches a value of zero, the initialization phase is thus completed by generation of an INIT COMP signal 77 and the CORE READ IN PROGRESS signal 92 is set. At this time, the output of latch 52 is loaded again into the memory address counter 54. This results since there is one clock time difference until the CORE READ IN PROGRESS signal 92 is provided. Without the CORE READ IN PROGRESS signal AND gates 80 and 94 provide low signals. Since AND gate 76 is also providing a low signal since the initialization phase is over, the select inputs to counter 54 are zero resulting in the loading function.

With the CORE READ IN PROGRESS signal 92, AND gates 94 and 80 become true thereby providing a three select input to the counter 54 resulting in the hold function. Thus, the two low order address signals received at the D2 and D1 inputs of counter 54 are held in its registers.

When the first DATA VALID signal 64 is received, the output of AND gate 100 becomes false. AND gate 100 is responsive to a - CORE DATA VALID signal 64, an INIT COMP signal 77 and the RQ 0B signal 82a. When AND gate 100 becomes false, it causes AND gate 94 to become false. As a result, the select input to memory address counter 54 becomes two resulting in the incrementing function.

It is thus apparent that the operation mode of counter 54 and register 66 are changed to account for the - CORE DATA VALID signals 64. The memory address counter 54 is now set up to increment rather than decrement the memory address and the data valid register 66 is set up to shift out the word request signals instead of rotating them every time a DATA VALID signal is received.

More particularly, register 66 is responsive after the initialization phase as follows. OR gate 108 is controlled by INIT COMP signal 77 thereby providing to the select input of register 66 a two value. AND gate 100 is responsive to the INIT COMP signal 77, the RQ 0B signal 82a, and each - CORE DATA VALID signal 64. When the INIT COMP signal 77 becomes true, register 66 will hold the rotated word requests signals in its registers. This results since both AND gate 100 and OR gate 108 become true. Since register 66 has been rotated to identify the first word requested, RQ 0B signal 82a is true and in addition the INIT COMP and - CORE DATA VALID signals are true. Thus, the select input to register 66 has a three value.

Subsequently, with each - CORE DATA VALID signal 64, AND gate 100 becomes false thereby changing the function of register 66 from hold to shift up and one word request is accounted for. AND gate 100 becomes true again when it detects another word request signal via the RQ 0B output 82a. Thus, the automatic shifting out of zeros is accounted for.

The output of AND gate 100 also controls the one select input to counter 54. After the initialization phase is complete, AND gate 76 becomes false. OR gate 78 is thus only responsive to a CORE READ IN PROGRESS signal 92 and AND gate 100. Since there is one clock period between INIT COMP signal 77 and CORE READ IN PROGRESS 92, counter 54 has a load function during this time. The first word request is thus stored and held in counter 54. This results since the select input changes from a zero value to a three value with the CORE READ IN PROGRESS signal. Again, since AND gate 100 is true once the initialization phase is over, both AND gates 80 and 94 become true with the CORE READ IN PROGRESS signal 92.

Subsequently, when a - CORE DTA VALID signal 64 is received, AND gate 94 becomes false changing the hold function of counter 54 to a incrementing function, i.e. the select input changes from a three value to a two value. With the next true word request, AND gate 100 becomes true making AND gate 94 true and changing the function of counter 54 to hold. Thus, since data valid register 66 and memory counter 54 receive corresponding control signals, they operate in concert once the CORE READ IN PROGRESS signal 92 occurs.

When there is only one one word request signal, i.e. the last one value is stored in the highest bit register of data valid register 66, and when the - CORE DATA VALID signal occurs indicating that this word request has been accounted for, the CORE READ IN PROGRESS signal 92 becomes false. More particularly, OR gate 110 has a false output when the last word request is accounted for by the - CORE DATA VALID signal. As a result, AND gate 112 becomes false making OR gate 88 also false. OR gate 88 has its other input false since there is no MEM ST RD signal thereby making AND gate 86 false after the initialization phase. With the output of OR gate 88 false, the output of flop 90 becomes false with the next clock signal. Thus, the CORE READ IN PROGRESS signal becomes false one clock time after INIT COMP signal 77 becomes false.

Even though the control logic 14 in the central processing unit as shown in FIG. 2 has been satisfied, the processor 10 remains busy until all the words have been removed from the data buffer 12.

In actual operation, after the data valid signal is received, the memory control unit waits two clock cycles before it triggers the transfer of the data from the data lines into the appropriate data buffer 12. This delay is provided by well known methods (not shown). The correct data buffer is selected by memory addresses 34 and 35 from the memory address counter 54 and the load pulse that is generated with the DATA VALID signal.

Memory Control Circuitry 32

Referring now to the memory control circuitry 32 which is shown more particularly in FIGS. 3a to 3d, the memory unit 18 comprises at least two memory controllers 26a and 26b operating in parallel. FIGS. 3a to 3d show circuitry which is identical in each of the two controllers 26, it being understood that operation of each controller depends upon whether or not the word being requested is either an odd word or an even word.

When four words are requested by processor 10 from memory unit 18, each memory controller 26 can cycle two memory storage modules 28 in parallel resulting in four memory locations being accessed in any one memory cycle time. One controller 26a handles the even addresses in the quadword responding to word request RQ0 and RQ2 signals 48a and 48c, respectively, and the other controller 26b handles the odd addresses responding to word request RQ1 and RQ3 signals 48b and 48d, respectively.

The distinction between the memory controllers is provided by memory request enable signals (MEM RQ EN) in each controller which when asserted in a particular controller allow the controller to operate on the corresponding word request RQ0 to RQ3 signals 48. Response to the starting address is by the odd controller if the first requested address is odd and is by the even controller if the first requested address is even.

In operation, the memory controller 26 starts on a succeeding clock pulse after the memory start signal has been generated in the central processing unit 10, provided th following conditions are true:

a. The address lines from bus 22 must have a value within the limits defined by the controllers address boundary register (not shown);

b. The memory controller has at least one match between a MEM RQ EN 0 to MEM RQ EN 3 signal and a corresponding RQ0 to RQ3 signals; and c. The memory controller must not be busy from the previous memory referenced.

Figure 3A:
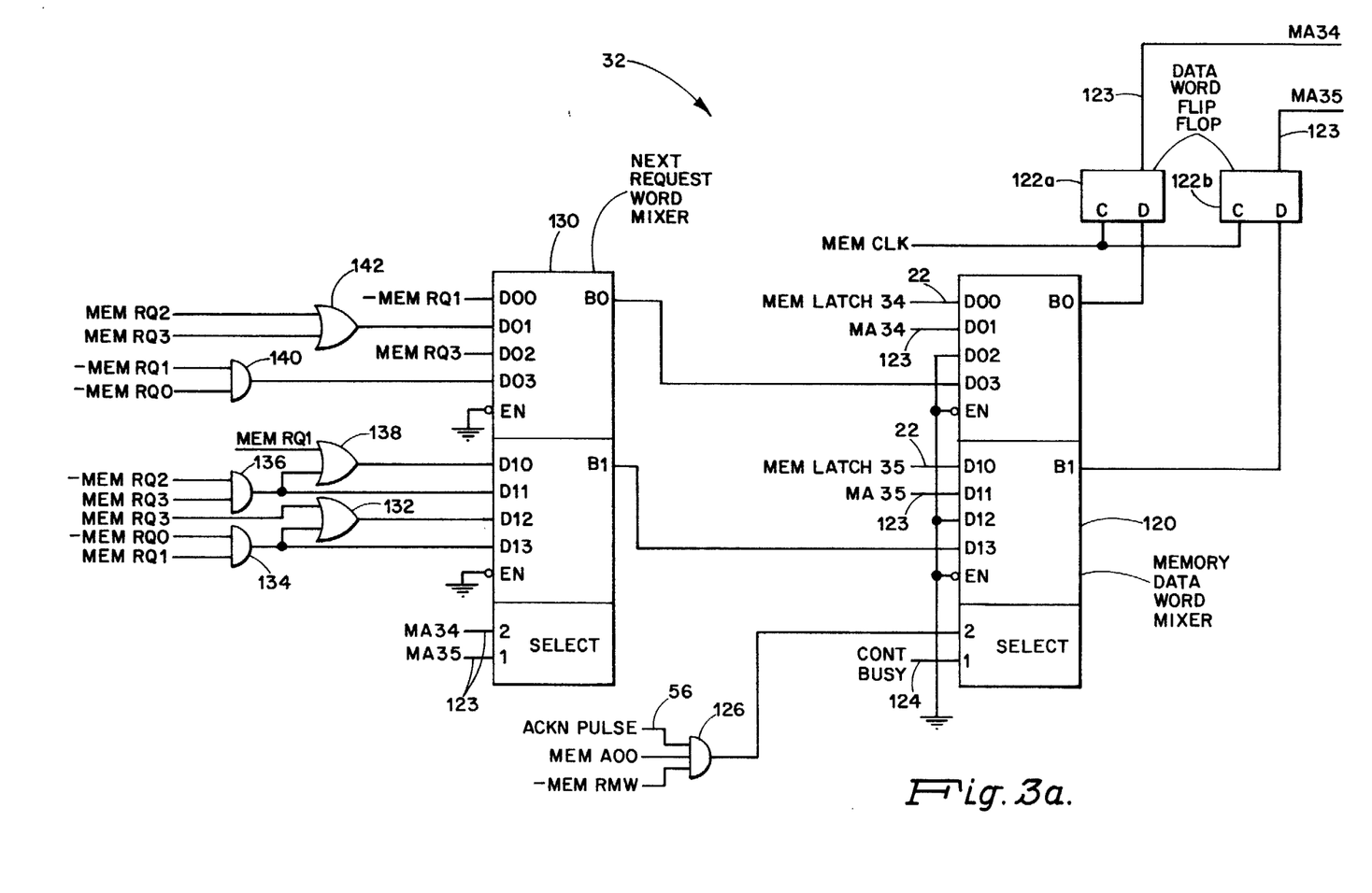
FIGS. 3a to 3d: are schematic diagrams of the memory control section incorporated in the memory unit of FIG. 1.

Assuming these conditions are true and referring to FIG. 3a, when the memory unit 18 started, the two low order address signals from bus 22 are transferred via a memory data word mixer 120 into data word request flops 122a and 122b. These signals are transferred via the D00 and D10 inputs of the main memory data word mixer 120. Initially, mixer 120 has neither select signals asserted and hence is enabled to its D00 and D10 inputs. At this time, mixer 120 selects the two low order address signals from bus 22 to transfer through the B0 and B1 outputs into the D input of flip flops 122a and 122b. Data word flops 122 designate the word to be sent or received over bus 20 by main memory depending on whether there is a read or write cycle. Mixer 120 is a standard 2×4 mixer manufactured by Texas Instruments, under the number 74S153.

Figure 3B:
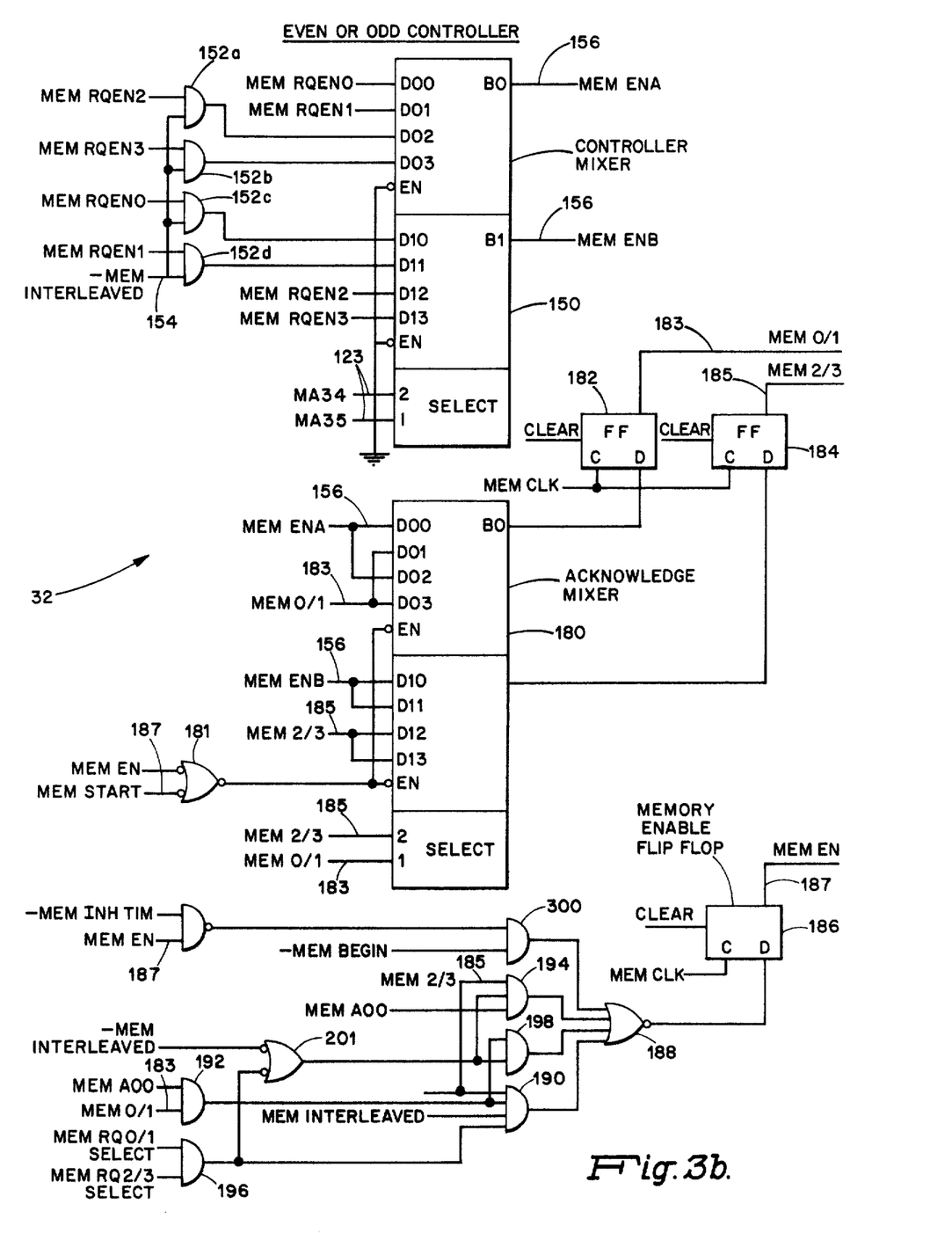

The output of data word flop 122a and 122b is transferred via lines 123 into a memory controller mixer 150 (FIG. 3b). The functions of mixer 150 outputs are to enable the generation of acknowledge signals, select the storage module to send or receive a word over bus 20 and supply inputs to an acknowledge mixer 180. Memory controller mixer 150 has as its data inputs the memory request enable signals (MEM RQ EN) which define whether or not the memory controller is an even or odd controller (26a or 26B, respectively). For example, and recognizing that FIG. 3b shows the same circuitry in each controller, if the memory controller were even, then MEM RQ EN signals 0 and 2 would have been generated by a diagnostic program such that only those signals would be true and MEM RQ EN signals 1 and 3 would be false.

More particularly, for example, if the second word was first requested, then the select input for mixer 150 would be enabled to receive signals at the D02 and D12 inputs. The D02 input would be false since it is reponsive to AND gate 152a. AND gate 152 is false since it is responsive to a MEM RQ EN 2 signal which is true and a - MEM INTERLEAVED signal 154 which is false. Signal 154 indicates that the memory unit operates in four-way interleaved mode and is set by a diagnostic program. Conversely, the D12 input would be enabled since the MEM RQ EN 2 signal would be present, i.e. the memory controller 26a responds to even words. As a result, the MEM EN B signal 156 becomes true and the controller 26a will provide the word to processor 10 as well as all the control signals with the word.

Thus, both the MEM RQ EN 2 and the MEM RQ EN 0 signals would be true if this were an even controller. Conversely, if it were an odd controller, the MEM RQ EN 1 and MEM RQ EN 3 signals would be true and the even number request enable signals would be false. Thus, with the MEM EN B signal 156 becoming true, this will then indicate that the controller 26a is generating the acknowledge signals. The memory enable A and B signals are also used for determining the number of words transferred as well as generating the enable and clock signals for transferring the data over the memory bus 16 data lines.

Figure 3C:
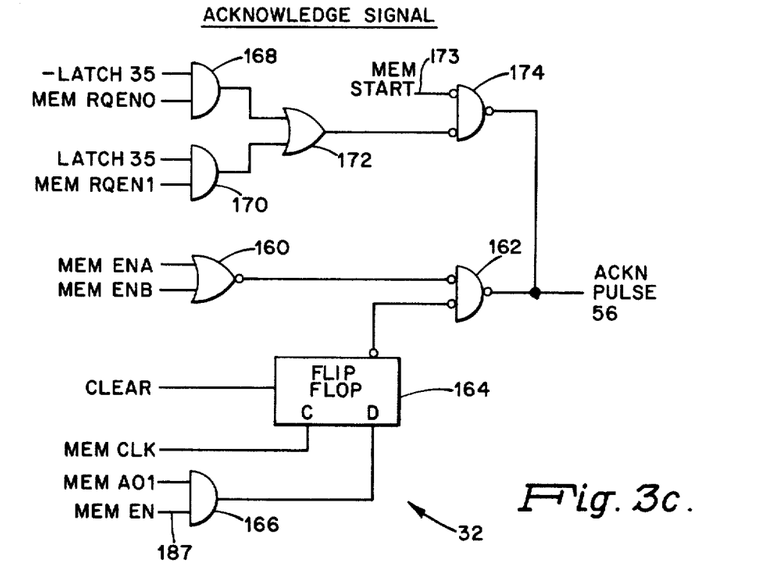

More particularly, the MEM EN A and B signals 156 are transferred into an OR gate 160 shown in FIG. 3c which provide one input to the acknowledge AND gate 162. The other input from AND gate 162 is received from a flip flop 164. Flip flop 164 is responsive to AND gate 166 which has two inputs, its first input being a MEM EN signal 187 which is asserted at the start of a memory cycle and remains true until the paticular controller has sent a number of ACKN signals 56 equal to the numer of words requested from it, and its second input MEM A01 is used to determine the correct time at which the acknowledge signals 56 are sent. The MEM EN signal 187 will be discussed infra. When flip flop 164 provides a true output, the enabling of AND gate 162 causes an acknowledge signal 56 to be sent to control circuitry 14 over bus 24.

FIG. 3c also shows additional circuitry which enables an even controller to send immediately back a first acknowledge signal if an even word is first requested and an odd controller to immediately send back a first acknowledge signal if an odd word is first requested. More specifically, AND gate 168 and AND gate 170 are responsive to the lowest order address signal from the address lines 22 (memory address 35) and also to either the MEM RQ EN 0 or MEM RQ EN 1 signals, respectively. Thus, whether or not this is an odd or even controller, either gate 168 or 170 is enabled but only in one of the controllers. More specifically, gate 168 is enabled if the requested word is even and the controller responds to even words and AND gate 170 is enabled if the word is odd and the controller responds to odd words. The output from AND gates 168 and 170 are provided to OR gate 172 which in turn provides one input to AND gate 174. AND gate 174 has the other input coupled to the memory start signal 173 which is responsive to the start signal from the central processing unit 10. As a result, with the start signal and either AND gate 168 or AND gate 170 becoming true, AND gate 174 becomes true thereby providing an acknowledge signal 56 back to the central processing unit 10.

The purpose of the logic shown in FIG. 3a is to determine the order in which words are transferred over bus 20. It is recalled that the two low order address signals determine which word is to be sent first. The two D-type flip flops 122a and 122b hold the binary number of the word currently being sent over the bus, i.e. 122b corresponds to lowest address signal over bus 22 and 122a corresponds to the next lowest address signal over bus 22. Data word mixer 120 determines the source of input to flop 122a and 122b and is controlled by its select inputs.

At the very start of a cycle when neither select input is asserted, mixer 120 selects its D00/D10 inputs, which are the two low order address signals over bus 22 (and hence the first word requested by processor 10). These signals are transferred to flop 122a and 122b. On the second clock signal of the memory cycle, CONT BUSY signal 124 becoms true selecting the D01/D11 inputs of mixer 120. This has the effect of holding the contents of flops 122a and 122b since its D01/D11 inputs are now the outputs of flops 122a and 122b.

During the remaining course of the memory cycle, mixer 120 switches between its 1 and 3 inputs, the switching depending on the value of its select input. When the select input having a two value becomes true, the next word to be transferred over bus 20 into flops 122a and 122b is loaded. The two select input to mixer 120 is asserted when AND gae 126 becomes true. AND gate 126 becomes true when:

a. the cycle is not a read modify write (-MEM RMW);
b. an ACKN signal 56 is being sent over bus 24; and
c. a timing signal MEM A00 becomes true.

Mixer 130 is the source of the next word to be transferred over bus 20. Its select inputs are the output signals from flops 122a and 122b and its data inputs are the memory word request signals 48 which are combinations of the MEM RQ0-RQ3 signals sent by processor 10.

In order to understand the operation of the circuitry in FIG. 3a, an example is provided which example will be used for all the circuitry in FIG. 3. Assume that the second word having a code 10 is to be the first word addressed by address bus 22. This word is transferred into the data word mixer 120 via the D00/D10 inputs. As a result, flip flop 122a and 122b would have a 10 code and thereby initialize next request word mixer 130 to its D02 and D12 inputs. For sake of completeness, assume that the zero word having a code 00 was the only one of four words not requested, i.e. the other three words are requested.

In view of the above, the D02 input of mixer 130 would provide a one signal since MEM RQ 3 signal is true. In addition, the D12 input of mixer 130 would receive a true signal since OR gate 132 is true. OR gate 132 is responsive to a MEM RQ 3 signa. As a result, word request mixer 130 would provide a 11 code at its B0 and B1 outpts indicating the next word to be processed by memory controller 26 would be word three.

Upon receiving an acknowledge signal 56, AND gate 126 becomes true with the memory time state MEM A00. This enables the three select input to memory data word mixer 120 which is now responsive to its D03 and D13 inputs. The D03 and D13 inputs are coupled to the B0 and B1 outputs of next request word mixer 130. The 11 code, i.e. word three, would then be transferred into mixer 120. Data word flops 122a and 122b loaded fro mixer 120 then show that the word three should be responded to by the memory controller 26.

It should be noted that the acknowledge signal 56 which is sent back to processor 10 over bus 24 is also sent to the corresponding controller so that both controllers 26 can decide which word to operate on next. In addition, the flops 122a and 122b both load the next word, however, only the memory controller corresponding to the odd or even word provides a response.

Assuming the same example, the select input to the next word request mixer 130 would now enable signals to come through its D03 and D13 inputs. The D03 input of mixer 130 receives a false signal since there is a - MEM RQ 0 and a MEM RQ 1 signal. It has been assumed that there was no request for the zero word but a request for the one word. As a result, the B0 output of mixer 130 would provide a zero. For the D13 input, it is true since there is a - MEM RQ 0 signal and there is a MEM RQ 1 signal as shown by AND gate 134. Since this is the case, AND gate 134 is enabled thereby providing a true input into mixer 130 and a binary one output. On the next acknowledge signal 56, data word flops 122a to 122b receive a 01 code indicating that word one should be responded to by memory controller 26b. From the above, it can be seen that the memory request for word zero would have been omitted. In like fashion, AND gates 136 and 140 and OR gates 138 and 142 are al responsive to the control request signals 40a to 40d (MEM RQ 0 to MEM RQ 3).

Referring again to FIG. 3b, the purpose of the remaining logic is to set the memory enable flop 186 at the beginning of a cycle and to clear it at the time in the cycle when the particular controller has sent the correct number of acknowledge signals for that cycle. The memory enable flop 186 is set at the beginning of the cycle by the memory begin signal to AND gate 300 going low making its output go low. Since the remaining inputs to NOR gate 188 are low, the output of NOR gate 188 goes high resulting in memory enable flop 186 becoming set. The memory enable flop 186 is held true by sending its high output to NAND gate 301 which, along with its other input, - MEM INH TIM, which is normally true, forces the output of 301 low which in turn holds the output of AND gate 300 false and therefore holds the memory enable flop in its true state. The memory enable flop 186 is held in its true state until one of AND gates 194, 198 or 190 provides a true signal making the output of NOR gate 188 false. This false signal then clears the memory enable flop 187.

AND gate 190 clears the memory enable flop 186 if there is an interleave three mode and the particular controller is operating to send two words to the processor 10, and therefore, supplies two acknowledge signals 56. If the output of AND gate 196 is true, then AND gate 190 is selected to clear flop 186 because two acknowledge signals are to be sent and therefore both MEM 0/1 signals 183 and MEM 2/3 signals 185 must be asserted. If output of gate 196 is false, then AND gates 194 and 198 are enabled, via NOR gate 200, and only the assertion of either MEM 0/1 signal 183 or MEM 2/3 signal 185 is necessry to clear the memory enable flop 186.

The purpose of acknowledge mixer 180 is simply to hold MEM 0/1 signal 183 and MEM 2/3 signal 185 in the true state after it has been set by MEM EN A or MEM EN B signals 156. The enable input to mixer 180 is controlled by OR gate 181 which is asserted at the beginning of a cycle by MEM START and held after that by MEM EN 187 and thus, when MEM EN is cleared, MEM 0/1 signal 183 and MEM 2/3 signal 185 are subsequently cleared on the next clock signal.

Referring in more detail to the logic in FIG. 3b, the MEM EN A and B signals 156 are provided to an acknowledge mixer 180. Acknowledge mixer 180 is coupled to D-type flip flops 182 and 184 whose output when true indicates that the word has been processed.

When the MEM EN A or MEM EN B signals 156 are generated, the D00 and D10 inputs will transfer either signal into flops 182 or 184, respectively. Upon receiving this signal, the select input of acknowledge mixer 180 is enabled thereby latching the word which has been transferred. More specifically, in the example, previously cited, which is that word two is the first word to be processsd, the MEM EN B signal 156 would be transferred through the D10 input thereby enabling on the next clock signal flop 184 to generate a true MEM 2/3 signal 185. The MEM 2/3 signal 185 indicates that the storage module either two or three, depending upon whether it is an even or odd controller, respectively, should provide an acknowledge signa. The MEM 2/3 signal 185 goes into the two select input of acknowledge mixer 180 thereby enabling its D02 and D12 inputs. Since the D02 input is reponsive to the MEM EN A signal 156 which has not occurred, flop 182 is not changed from its zero state. Conversely, the D12 input is responsive to the MEM 2/3 signal and therefore latches its true signal in flop 184.

If at a later time the word zero was accessed, the acknowledge mixer 180 would automatically account for the transfer. This results since mixer 180 is responsive to its D02 input by virtue of the MEM 2/3 signal 185 being set. Since the MEM EN A signal 156 would be provided to D02 input, acknowledge mixer immediately accounts for this situation and sets flop 182.

When all the acknowledge signals have been generated, memory enable flop 186 becomes false thereby disabling AND gate 166 and preventing any further acknowledge signals 56 from being sent over bus 24. This occurs as follows: AND gate 190 is responsive to the memory controller 26 transferring two words to processor 10. If the memory controller 26 has transferred two words the MEM 0/1 and MEM 2/3 signals are true. The MEM 0/1 signal 183 when true enables AND gate 192 at time state A01. The MEM 2/3 signal is provided to AND gte 194 and ANd gate 190. When AND gate 190 has the memory interleave signal true which indicates that the memory is operating in fourway interleave mode and when the output of AND gate 196 is true which indicates that this controller is processing two words, than AND gate 190 provides a true signal to NOR gate 188 resulting in memory enable flop becoming false and memory enable signal 187 becoming false. When this occurs, no further acknowledge pulses 56 may be sent.

While AND gate 190 is responsive to both words from the memory controller 26 being processed, AND gates 194 and 198 are responsive to the situation wherein the processor asks for only one word from a particular controller. For example, if there was no word request signal for word zero, then the even controller would only send back one word. In this situation, AND gate 190 would always be false since it is responsive to both MEM 0/1 and MEM 2/3 signals, and in this particular situation, the MEM 0/1 signal would never become true. Moreover, AND gate 196 would not be satisfied in this situation since the MEM RQ 0/1 SEL signal would be false since no word zero was requested.

Howver, either AND gates 194 or 198 would be able to be enabled if only one word is requested and processed. Assuming that this is an even controller and that word zero was not asked for, then AND gate 194 would become true. AND gate 194 is responsive to the MEM 2/3 signal, i.e. for this situation the second word has been processed, memory time state A00 occurs and a signal is generated from OR gate 200. OR gate 200 is responsive to a low signal from AND gate 196, i.e. that only one request has been made, or the memory interleave signal is low. Since the signal from AND gate 196 is low, OR gate 200 provides a true signal to AND gate 194 and AND gate 190. With the concurrence of the above signal, AND gate 194 becomes true thereby disabling memory enable flop 186 and, subsequently, any further acknowledge pulses 56 because of AND gate 166 and flop 164.

Conversely, if the second word was not requested, then AND gate 198 would become true. AND gate 198 is responsive to the MEM 0/1 signal 183 from flop 182 and memory time state A00 which is provided to AND gate 192. In addition, AND gate 198 is responsive to the output of OR gate 200 which indicates that only one memory request has been made. When AND gate 198 becomes true, memory enable flop 186 becomes false thereby terminating any further acknowledge pulses 56 from being generated.

Figure 3D:
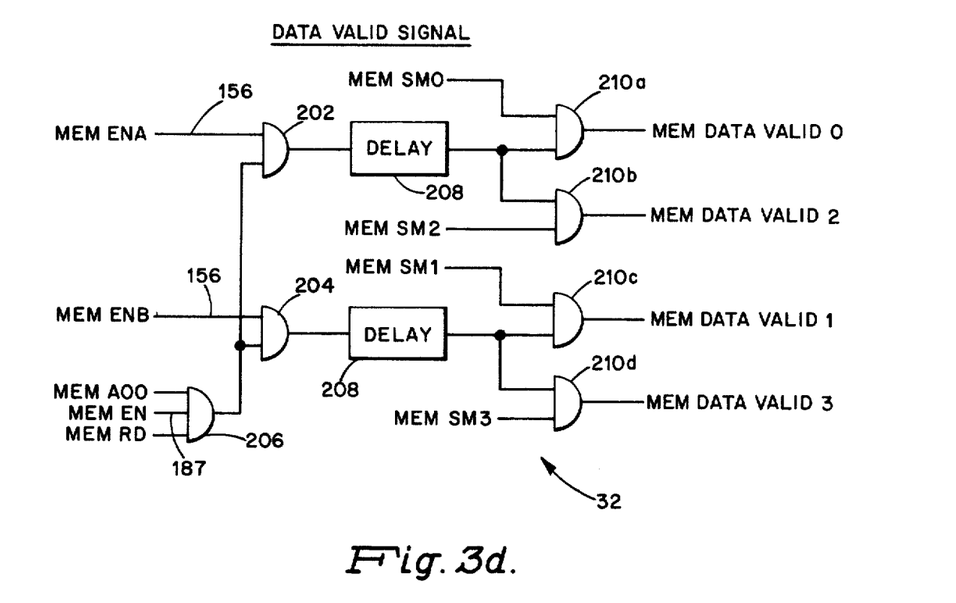

Referring to FIG. 3d, the generation and transfer of the DATA VALID signals is shown. More particularly, the MEM EN A and B signals 156 as generated in FIG. 3b from each of the controllers are provided to AND gates 202 and 204, respectively. Each AND gate 202 and 204 is responsive to an AND gate 206 which becomes true when there is a memory read request, when the MEM EN signal 187 from memory enable flop 186 is true and when memory time state A00 is true. Therefore, AND gates 202 and 204 are responsive when the word from data mixer 120 is transferred into controller mixer 150 and the MEM EN A or B signal 156 is generated.

The signals from gates 202 and 204 are transferred into delay circuits 208 and are then transferred into a plurality of AND gates 210a to 210d. AND gates 210a and 210c are responsive to a signal indicating that a particular storage module is selected and also to the MEM EN A signal 156 through AND gate 202 and delay circuit 208. Likewise, AND gates 210b and 210d are responsive to the MEM EN B signal 156 through AND gate 204, delay circuit 20 and a particular storage module being selected. The storage module signals MEM SM 0 and MEM SM 1 corresponds to storage modules 28a and 28c in controller 0 and storage module 28b and 28d in controller 1. Assume that word two was requested and storage module 28c has transferred this word to processor 10. Under this situation, AND gate 210c is satisfied and a MEM DATA VALID 1 signal becomes true. This signal indicates that the word transferred from memory storage module 28c is on the data bus 20 and is valid.

Conversely, if it were memory storage module 28a which was transferring the word and/or receiving the word from processor 10, then AND gate 210a would become true and transfer a MEM DATA VALID 0 signal. Thus, as the four words of data are read from the storage modules 28 into the storage module buffers 30, each data valid signal gates the control bus 24 which allows the corresponding data word to be placed on data bus 20.

As is apparent, words are placed in the bus in the same order as the addresses are acknowledged. The central processor 10 then uses the DATA VALID signals to shift the data valid register 66. The memory transfer operations end when the last requested word has been collected. In the case of a read operation, the controller remains busy until all DATA VALID signals have been generated and the memory cycle has ended.

Thus, it has been shown how the control logic 14 in FIG. 2 and control logic 32 in FIG. 3 coact to access and transfer up to four words with the needed word being transferred first. In addition, the control logic, upon accessing the first requested word, is cycled in ascending modulo four order to account for each word requested and transferred.

While the particular embodiment describes a read operation, it is understood that the control circuitry is also responsive to write operations. However, where the read signals have been shown, there would be instead write signals. In addition, for the write operation, the data buffer 12 would initially store the words and upon the memory address being enabled the data woul be transferred over data bus 20 to the memory controller.

The instant invention is applicable in a system having a plurality of memory units 18 and a plurality of processing units. For example, in the embodiment of the present invention 16 memory controllers 26 are provided with 32 storage modules 28. Moreover, to address these memory units there are a number of processing units or equivalents such as direct memory access devices, data channels, etc. Each of these equivalent devices can access any of the plurality of memory units 18. Obviously, other architectural modifications and changes will be apparent to one skilled in the art in order to utilize the present invention.

Moreover, it is obvious that many modifications and changes may be made to the apparatus of the instant invention. For example, instead of the special purpose counters that have been shown in the instant invention, the use of a RAM having the ability to sequence through the various states and skipping intermediate states could have been used. Moreover, other changes and modifications to the above invention will be recognized by those of ordinary skill in the art. It is therefore the intention to only be limited by the claims which are now recited.

We claim:

1. In a data processing system of the type including a central processing unit for addressing memory locations in a plurality of memory units, each of said memory units storing data in said memory locations, each memory location having a unique address, and bus means connecting the central processing unit and the memory units for transmission of data, memory address and control signals, an apparatus for controlling in a memory cycle the transfer of data between said processing unit and said memory units, said apparatus comprising:

A. first means coupled to said central processing unit and responsive to a memory start signal and a plurality of word request control signals from said central processing unit for simultaneously generating a plurality of memory request signals to said memory units, via said bus means, each of said memory request signals in conjunction with said memory address signals identifying one of said memory locations in said memory units;

B. second means coupled to said central processing unit and responsive to said memory address signals, said word request control signals and said memory start signal for storing identifiers of the order of the addressed memory location from which data is to be transferred;

C. third means coupled to said central processing unit and responsive to said word request control signals for storing a plurality of first signals equal to the number of said memory request signals transferred over said bus means to said memory units, said third means coupled to said memory start signal for disabling said memory start signal; and D. fourth means coupled to said memory units and responsive to said first means for serially identifying to said central processing unit and transferring between said central processing unit and said memory units the data stored in each of said memory locations responsive to the combination of said memory address signals and said memory request signals.

2. An apparatus as defined in claim 1 wherein said fourth means include:

A. means responsive to said memory address signals for identifying the initial memory location in said memory units with which the data is to be transferred;

B. means responsive to said memory request signals and said identifying means for altering said identifying means to identify the next memory location in said memory units with which data is to be transferred;

C. means responsive to said identifying means and said memory start signal for generating a pluality of first and second control signals to said third and said second means, respectively, each of said first and second control signals indicating the status of said memory units.

3. An apparatus as defined in claim 2 wherein said third means include:

A. acknowledge means responsive to said first control signals from said memory units for comparing the number of said first control signals from said memory units to the number of said memory request signals from said first means, said acknolwedge means upon said comparison indicating that the total number of acknowledge signals equal the total number of memory request signals disabling said memory start signal.

4. An apparatus as defined in claim 3 wherein said second means further includes:

A. valid means responsive to said second control signals from said memory units indicating that said memory units have exchanged data in said memory locations, said valid means, upon receiving a number of second control signals from said memory units equal to the number of said plurality of memory request signals from said first means, disabling said memory cycle.

5. An apparatus as defined in claim 4 wherein said third means further includes control means responsive to said second means for initializing said valid means such that said plurality of first signals is rotated to indicate the order with which data is to be transferred between said memory units and said processing unit.

6. An apparatus as defined in claim 5 and further including data buffer means coupled to said central processing unit for storing adata and, wherein said valid means shifts the order of said first signals in response to said second control signals, said valid means identifying one of said data buffer means for storing the data to be transferred between said processing unit and said memory units.

7. An apparatus as defined in claim 6 and further including:

A. fifth means coupled to said acknowledge means for accounting for the absence of at least one of said plurality of first signals from said first means, said fifth means in response to each of said first control signals accounting for one of said first signals, said fifth means in response to the absence of at least one of said first signals automatically shifting said acknowledge means such that said absence of one of said first signals is accounted for.

8. An apparatus as defined in claim 7 and further including:

A. sixth means coupled to said valid means for accounting for the absence of a request from said first means;

B. said valid means selectively correlating the order in which the data between said central processing unit and said memory units is exchanged such that said date in said central processing unit is properly accounted for;

C. said sixth means in response to each of said second control signals from said memory units accounting for one of said memory request signals from said first means; and D. said sixth means in response to the absence of said memory request signals automatically shifting said valid means.

9. An apparatus as defined in claim 8 wherein said acknowledge means includes a shift register for shifting the order of said first signals and said valid means includes a shift register for rotating and shifting the order of said plurlaity of first signals.

10. An apparatus as defined in claim 2 wherein said generating means include:

A. data acknowledge means for generating said first control signals indicating that said memory units contain said memory locations; and B. data valid means for generating said second control signals indicating that the data in said memory locations has been transferred over said bus means between said central processing unit and said memory units.

11. An apparatus as defined in claim 10 wherein said data acknowledge means include:

A. seventh means responsive to said first means and to said memory start signal for generating to said central processing unit the initial one of said first control signals upon receipt of said memory start signal; and B. eighth means responsive to said seventh means and to a memory enable signal from said memory units for generating subsequent first control signals to said central processing unit.

12. An apparatus as defined in claim 2 wherein said fourth means include:

A. at least two memory controllers, each controller responsive to said plurality of memory request signals from said first means;

B. a plurality of storage modules, the even numbered storage modules coupled to at least one of said memory controllers and the odd numbered storage modules coupled to at least the other of said memory controllers; and C. means coupled to said memory controllers and responsive to the combination of said memory address signals and said memory request signals for generating a code indicating each of the memory locations with which the data is to be transferred.

13. An apparatus as defined in claim 12 wherein:

A. said one memory controller having said even storage modules provides said first and second control signals to said central processing unit when said data to be transferred is from said even storage modules, said one memory controller being inhibited when said data to be transferred is from said odd storage modules; and B. said other memory controller having said odd storage modules provides said first and second control signals to said central processing unit when said data to be transferred is from said odd storage modules, said other memory controller being inhibited when said data to be transferred is from said even storage modules.

14. In a data processing system of the type including a central processing unit for addressing memory locations in a plurality of memory units, each of said memory units storing data in said memory locations, each memory location having a unique address, and bus means connecting the central processing units and memory units for transmission of data, memory addresses and control signals, an apparatus for controlling in a memory cycle the trnasfer of data between said processing unit and said memory units, said apparatus comprising:

A. means responsive to a memory start signal from said processing unit for simultaneously addressing in said memory units a variable number of memory locations with which data is to be transferred;

B. means within said memory units for serially responding to said simultaneously addressing means, said responding means including:
  1. first means for ordering the accessing of said variable number of memory locations in said memory units; and
  2. means responsive to said first ordering means for generating a first and second plurality of control signals equal in number to the number of simultaneously addressed memory locations; and C. means within said central processing unit and responsive to said serially responding means for correlating the data transferred between said central processing unit and said memory units, said correlating means including:
  1. second means for ordering in said central processing unit the transfer of data between said variable number of memory locations and said central processing unit; and
  2. means responsive to said second plurality of control signals for changing said second ordering means, said secnd ordering means identifying to said central processing unit each serial exchange of said data.

15. An apparatus as defined in claim 14 wherein said second ordering means include:

A. means responsive to said simultaneously addressing means for storing word request signals corresponding to the total number of addressed memory locations;

B. means responsive to said first plurality of control signals for shifting said storing means to indicate the acknowledgement of data in one of said memory locations; and C. means coupled to said storing means and responsive to the absence of said word request signals for automatically shifting said storing means so as to identify the next data exchange in said central processing unit to correlate with the next transfer with said memory units.

16. An apparatus as defined in claim 14 wherein said simultaneously addressing means include the combination of:

A. said memory address signal addressing one of said memory locations in said memory units; and memory address signal having a first part and a second part, said first part capable of addressing a number of said memory locations and said second part identifying one of said memory locations;

B. a plurality of word request signals indicating the total number of words to be serially accessed by said memory unit, said first part of said memory address signal and each of said word request signals identifying each of said memory locations; and wherein, C. said second ordering means in response to said second part of said memory address signal and said word request signals is arranged to account for each data transfer in modulo four order; and whereby, said combination of said memory address signal and said word request signals address a variable number of memory locations in said memory units.

17. A data processing system for accounting for transfer of words between a central processing unit and a plurality of memory units over a bus means, said central processing unit addressing a plurality of memory locations in said memory units in parallel and wherein the transfer of words between said central processing unit and said memory units occurs in series, said system comprising:

A. first control means in said central processing unit comprising:
  1. first means responsive to a memory start signal and word request control signals for providing memory request signals to said memory units;
  2. second means responsive to said memory start signal and to a first part of said memory address signal for identifying an initial word to be transferred;
  3. third means responsive to said word request control signals for storing said word request control signals, said third means identifying the total number of words requested by said central processing unit; and
  4. fourth means responsive to said word request control signals and to said second means for storing said word request control signals, said fourth means identifying the order of said words to be exchanged between said central processing unit and said memory units; and B. second control means in said memory units comprising:
  1. fifth menas responsive to said first part of said memory address signal for identifying in said memory units the initial word to be transferred;

2. sixth means responsive to said fifth means and said memory request signals for enabling said fifth means to identify the next word in said memory units to be trnsferred; and 3. seventh means responsive to said memory request signal and a memory enable signal for providing a plurality of control signals indicating the status of said memory units to said central processing unit.

18. The system as defined in claim 17 wherein said second means includes:

A. means responsive to clock pulses in said central processing unit for decrementing the value of said second part of said memory address signal; and B. means for inhibiting said decrementing means when said vaue becomes zero.

19. A system as defined in claim 18 wherein:

A. said fourth means in response to said decrementing means of said second means rotates said order of words to be exchanged such that said order in said fourth means corresponds to the order said words are transferred to said memory units; and B. wherein said fourth means further includes:

1. means responsive to the absence of word request control signals in said fourth means for automatically rotating said order of words such that the absence of word request control signals is not acknowledged.

20. An apparatus as defined in clalim 19 wherein said fourth means further includes:

A. means responsive to one set of control signals from said seventh means for rotating said order of words in said fourth means; such that said fourth means compares said word request signals to said one set of control signals;

B. said rotating means including means for altering during the rotation the lowest order word such that it indicates the absence of a word request signal; and C. means responsive to the absence of a predetermined number of word request control signals in said fourth means for indicating the completion of transfers between said central processing unit and said memory units.

21. An apparatus as defined in claim 17 wherein said third means is shifted in response to a second set of control signals from said seventh means, said third means compares the number of said word request signals to the number of said second set of control signals, and wherein said third means further includes:

A. means responsive to the absence of a word request control signal for automatically shifting said third means; and B. means responsive to the absence of a predetermined number of word request signals for terminating said memory start signal.

* * * * *